Figure 1:
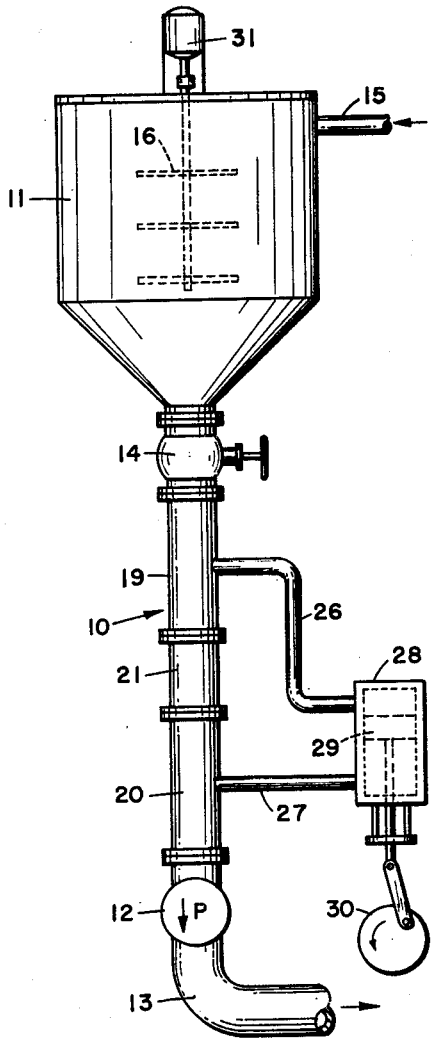

Aug. 4, 1964     D. B. TODD     3,143,124
AIDING FLOW OF PSEUDO-PLASTICS THROUGH CONDUITS
Filed Dec. 19, 1960

INVENTOR:
DAVID B. TODD
BY: Oswald H. Milmore
HIS ATTORNEY 3,143,124
AIDING FLOW OF PSEUDO-PLASTICS
THROUGH CONDUITS
David B. Todd, Berkeley, Calif., assignor to Shell Oil
Company, New York, N.Y., a corporation of Delaware
Filed Dec. 19, 1960, Ser. No. 76,607
5 Claims. (Cl. 137—13)

The invention relates to the flow of pseudo-plastics through conduits, such materials being also called non-Newtonian liquids. Polymer solutions are frequntly an example of pseudo-plastics. More particularly, the invention is concerned with aiding or initiating the flow of such fluids.

In ordinary liquids, called Newtonian liquids, flow resistance is proportional to shear rate. Hence the flow resistance as minimum when the liquid is not flowing and there is no difficulty in initiating flow. However in the case of some non-Newtonian liquids, such as pseudo-plastic liquids, the coefficient of flow resistance is very high when the liquid is at rest but decreases sharply when the shear rate is increased, as when flow through a pipe occurs. Stated otherwise, such liquids exhibit a high apparent viscosity when at rest. This presents important problems in initiating flow through conduits. For example, when it is desired to flow a pseudo-plastic liquid of sufficient viscosity from an elevated tank through a vertical pipe to a pump, starting from a non-flow condition, flow by gravity either does not occur or occurs at an unacceptably low rate, which is not increased by the suction of the pump; raising the tank level to increase the hydrostatic head does not help significantly to initiate flow because the apparent viscosity is effective throughout the length of the conduit to oppose the flow.

The behavior of non-Newtonian pseudo-plastic liquids considered herein is analogous to thixotropy but differs therefrom in that the apparent viscosity is a function of the shear rate and not a function of the time of applied shear.

The term "pseudo-plastic liquid" is, for the purposes of this specification, used to include Bingham liquids, which exhibit similar characteristics insofar as the invention is concerned and differ from true pseudo-plastics only in the shape of the shear stress-rate curve at extremely low shear rates.

The above-mentioned difficulty in aiding or initiating flow of pseudo-plastic liquids has heretofore either required the use of complex facilities for applying pressure to the upstream end of the conduit or the dilution of the liquid by a thinning solvent so as to lower the apparent viscosity.

It is the object of the invention to overcome the stated difficulty, and reduce the apparent viscosity and initiate flow of non-Newtonian liquids so as to obviate the need for such pressurizing expedients while, at the same time, making it possible to handle such liquids in a more concentrated form.

According to the invention it was found that flow of a pseudo-liquid through a conduit can be aided or initiated from the non-flowing condition by providing the conduit with movable, e.g., flexible walls and moving the walls at spaced locations in a manner to cause flow of the liquid within the conduit alternately in opposite directions. In preferred embodiments the movable walls are displaced axially one from the other and are moved so that during one half of each cycle the volume within the conduit adjoining one movable wall is diminished at first while the volume adjoining the other movable wall is being increased, and during the other half of the cycle the volumes at the said two walls are altered in the opposite senses. The resulting reciprocating flow of the liquid is, therefore, along the axis of the conduit.

Typically, the walls are moved at a frequency of 50 to 1000 cycles per minute, the frequency being lower as the distance between the two flexing walls and the amplitude increases.

This to and fro movement of the liquid modifies the physical nature of the liquid and creates a sharp drop in apparent viscosity, at least near the wall of the conduit. In fact, the liquid in the core may flow as a body with only slight shear rates, so that the apparent viscosity remains high interiorly of the wall; this does not prevent attainment of the objects of the invention. When the viscosity drops, at least near the conduit wall, the normal flow through the conduit becomes possible and after such flow commences movement of the walls can be discontinued; however, it can be continued to aid flow.

It should be noted that the wall-moving or flexing action according to the invention is not one which induces net flow through the conduit; in other words, the movable walls do not act as a pump nor do they produce an effect resembling the peristaltic of the digestive system of living beings, but cause reciprocating flow.

The invention is applicable to horizontal, inclined or vertical conduits, and the desired flow—after the apparent viscosity is reduced—may be upward or downward.

Figure 2:
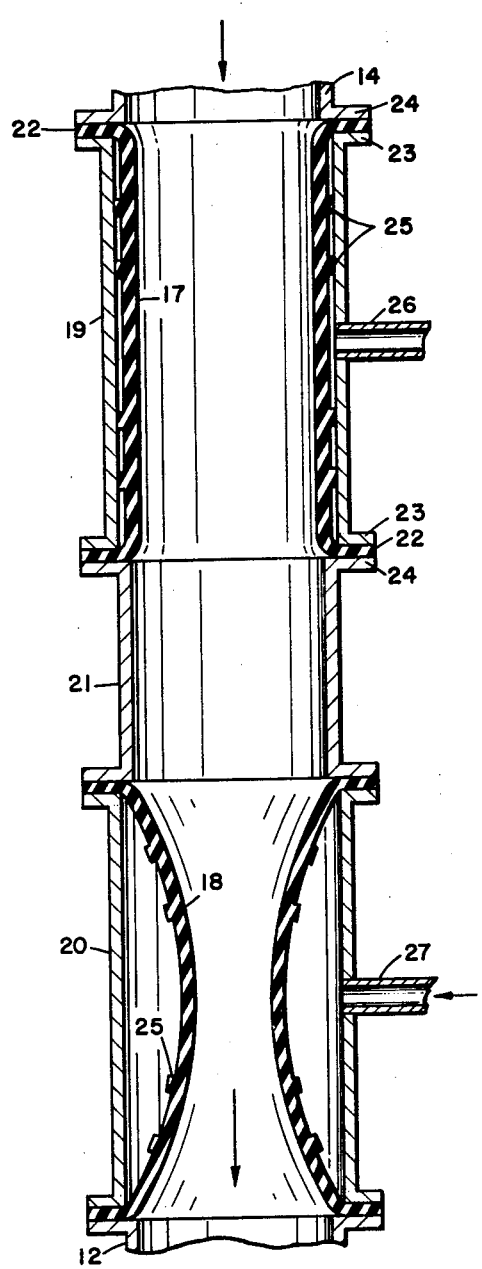

The invention will be further described with reference to the accompanying drawings showing one preferred embodiment by way of illustration, wherein:

FIGURE 1 is an elevation view of a conduit provided with the pulsing means according to the invention; and FIGURE 2 is a vertical sectional view through the conduit, drawn on an enlarged scale.

Referring to the drawings, the conduit 10 is illustrated as applied to feed liquid from a tank 11 to a pump 12 having a discharge pipe 13; a shut-off valve 14 is optionally provided. The tank may be provided with suitable inlet means, represented by a pipe 15 and an agitator 16 driven by a motor 31. When the tank contains a pseudo-plastic liquid such as an elastomer, e.g., polyisoprene or polybutadiene, diluted with a light hyrocarbon, e.g., a solvent consisting principally of hydrocarbons having four to eight carbon atoms, and the flow is stopped, as by closing the valve 14 and/or stopping the pump 12, the liquid within the conduit 10 acquires such a high viscosity that it will not flow by gravity or flow only at a negligible rate. When, subsequently, the valve is opened and the pump is started cavitation occurs at the pump suction even when the contents of the vessel 11 are agitated by the stirrer 16.

Now in accordance with the invention the conduit 10 is provided with flexible walls 17 and 18, which are fitted within rigid-walled, metal pipe sections 19 and 20, respectively. The latter may be adjoining or may be separated by an intermediate, rigid section 21 which is not provided with flexible walls. As is evident from the drawings, the flexible walls are tubular in shape and have flanges 22 which are clamped between the flanges 23 of the pipe sections and corresponding flanges 24 of adjoining fixtures. The flexible walls may be made of rubber or cord-reinforced rubber and may optionally have integral therewith outward projections 25 which form spacer elements to prevent the flexible walls from lying flat against the inner walls of the pipe sections. Fitted to each pipe section 19 and 20 so as to communicate with the sealed, annular space between the flexible wall and the respective pipe section is a pipe 26 or 27 connected to expansible chambers of suitable pumping means, e.g., to the ends of a cylinder 28 which contains a reciprocating piston 29 driven by a crank 30. The cylinder and pipes 26 and 27, as well as the said annular spaces, are filled with a hydraulic fluid, preferably a liquid.

In operation, after flow in the column of liquid within the conduit 10 is stopped for any reason, as when the pump 12 is stopped, and before again placing the conduit into operation, the crank 30 is operated to pump the hydraulic fluid alternately into the upper and lower lined pipe sections 19 and 20. Thus, FIGURE 2 shows the condition when the hydraulic fluid has been exhausted from the upper pipe section and charged into the lower section, thereby forcing the flexible wall 18 away from the pipe wall. During the next upward stroke of the piston 29 the flexible wall 17 is similarly forced away from its pipe while the wall 18 flexes outwardly; this diminishes the volume within the conduit section 19 and increases the volume within the section 20 and causes the liquid therein to flow downwards. On the next downward stroke of the piston the flow of hydraulic fluid is reversed, causing the flexible walls to return to the condition illustrated and causing the liquid to flow upwards. This back-and-forth flow of the pseudo-plastic liquid reduces its apparent viscosity at least near the conduit walls and permits flow by gravity into suction inlet of the pump 12. When this flow has begun the operation of the crank 30 may be stopped, e.g., leaving both of the flexible walls partially distended. However, the crank may be kept in operation to continue the wall-flexing and thereby aid in the flow of the liquid. Such continued operation is desirable when it is desired to pump at a rate higher than that at which the liquid would continue to flow after flow is initiated.

A particular advantage of the invention is that it becomes possible to handle elastomer solutions and the like which are more concentrated. Thus it is not necessary to add as much diluent as was heretofore required for causing flow through the conduit.

*Example*

A solution of 15% by weight polyisoprene in pentane, after standing for 10 minutes at room temperature in a vertical conduit 6 in. in diameter and 11 ft. high, had an apparent viscosity so high that the solution would flow by gravity at only two gallons per minute into the suction intake of a positive displacement pump. When this solution is oscillated at the walls of the conduit by moving the flexible walls as shown in the drawings at a rate of 600 cycles per minute, the apparent viscosity is reduced to the extent that the pump is able to operate at a rate of 126 gallons per minute. A somewhat diminished flow rate could be continued after the movement of the flexible walls was stopped.

I claim as my invention:

1. Method of aiding the flow of a pseudo-plastic liquid through a conduit wherein said liquid is situated and is initially at rest comprising the steps of moving a pair of axially spaced walls of said conduit which are in contact with said liquid alternately in opposite directions so as alternately to diminish and increase the conduit volumes of the conduit zones adjoining said walls, said motions being coordinated so that the volume increases at one said wall while it diminishes at the other throughout the entire movement thereof, thereby inducing a reciprocating flow of said liquid and reducing the apparent viscosity thereof at least at the conduit wall.

2. Method according to claim 1 wherein said walls are moved at a frequency of between about 50 to 1000 cycles per minute.

3. A conduit having means to reduce the apparent viscosity of a pseudo-plastic liquid contained therein, said conduit comprising: a conduit having an inlet and an outlet and including a pair of internal, axially spaced walls which are movable to diminish and increase alternately the conduit volumes at zones respectively adjoining said walls, and actuating means for moving said walls repetitively and out of phase with one another throughout the entire movement thereof such that one of said volumes increases while the other diminishes, whereby liquid within said conduit is subjected to reciprocating movement for lowering the apparent viscosity thereof at least near the conduit wall.

4. A conduit having means to reduce the apparent viscosity of a pseudo-plastic liquid contained therein which comprises: a conduit having an inlet and an outlet and including a pair of internal, axially spaced walls which are movable inwardly and outwardly to diminish and increase alternately the volumes of the conduit zones adjoining said walls; means for stopping the flow of said liquid through said conduit while the conduit is filled therewith; and means for initiating flow of said liquid after cessation of flow including means for actuating said walls for repetitive movement out of phase with one another throughout the entire movement such that one of said volumes increases while the other diminishes, whereby liquid within said conduit is subjected to reciprocating movement for lowering the apparent viscosity thereof at least near the conduit wall.

5. A conduit having means to reduce the apparent viscosity of a pseudo-plastic liquid contained therein which is initially at rest, said conduit comprising: a rigid pipe having an inlet and an outlet; a pair of flexible liners situated within said pipe in axially displaced relation, each said liner being sealed at the ends thereof to said pipe and defining therewith a separate, confined annular space; and pump means for forcing a hydraulic fluid repetitively into and out of one of said annular spaces while flowing a hydraulic fluid out of and into the other spaces, said pump means being so constructed that the flow of hydraulic fluid relative to said one space is always out of phase with the flow relative to the other space, thereby alternately distending said liners to vary the conduit volumes therein and causing reciprocating flow of liquid therethrough in an axial direction for lowering the apparent viscosity thereof at least near the conduit wall.

References Cited in the file of this patent

UNITED STATES PATENTS

| 1,454,485 | Persch | May 8, 1923 |
|---|---|---|
| 1,655,197 | Sauter | Jan. 3, 1928 |
| 2,072,761 | Lum | Mar. 2, 1937 |
| 2,088,042 | Stephens | July 27, 1937 |
| 2,092,629 | Allen | Sept. 7, 1937 |
| 2,646,905 | Vincent | July 28, 1953 |
| 2,737,977 | Kurek | Mar. 13, 1956 |
| 2,915,078 | Ochs | Dec. 1, 1959 |
| 3,007,416 | Childs | Nov. 7, 1961 |
| 3,039,309 | Vesper | June 19, 1962 |

FOREIGN PATENTS

| 1,007,632 | Germany | May 2, 1957 |